US008287344B2

(12) United States Patent
Miller

(10) Patent No.: US 8,287,344 B2
(45) Date of Patent: Oct. 16, 2012

(54) MULTI SESSION GAMING

(75) Inventor: Mark A Miller, Chicago, IL (US)

(73) Assignee: CFPH, LLC, New York, NY (US)

( * ) Notice: Subject to any disclaimer, the term of this patent is extended or adjusted under 35 U.S.C. 154(b) by 0 days.

(21) Appl. No.: 13/409,349

(22) Filed: Mar. 1, 2012

(65) Prior Publication Data

US 2012/0157202 A1 Jun. 21, 2012

Related U.S. Application Data

(63) Continuation of application No. 12/256,634, filed on Oct. 23, 2008, now Pat. No. 8,137,173.

(51) Int. Cl.
*G06F 17/00* (2006.01)

(52) U.S. Cl. .......................................................... 463/11

(58) Field of Classification Search .............. 463/11–13, 463/16–25; 273/148 A, 148 P, 148 R, 149 P, 273/149 R, 309
See application file for complete search history.

(56) References Cited

U.S. PATENT DOCUMENTS 4,266,770 A 5/1981 Yeager
4,531,187 A 7/1985 Uhland
4,926,327 A 5/1990 Sidley
5,255,915 A 10/1993 Miller
5,356,145 A 10/1994 Verschoor
5,586,766 A 12/1996 Forte et al.
5,605,334 A 2/1997 McCrea, Jr.
5,630,753 A 5/1997 Fuchs
5,682,550 A * 10/1997 Brown et al. ................... 710/10
5,707,287 A 1/1998 McCrea, Jr.
5,803,808 A 9/1998 Strisower
5,836,586 A 11/1998 Marks et al.
5,851,147 A 12/1998 Stupak et al.
5,941,769 A 8/1999 Order
5,967,894 A 10/1999 Kinoshita et al.
6,126,541 A 10/2000 Fuchs
6,139,014 A 10/2000 Breeding et al.
6,217,447 B1 4/2001 Lofink et al.
6,386,973 B1 5/2002 Yoseloff
6,585,591 B1 7/2003 Baerlocher et al.
6,612,926 B1 9/2003 Dabrowski
6,663,487 B1 12/2003 Ladner
6,811,486 B1 11/2004 Luciano, Jr.

(Continued)

FOREIGN PATENT DOCUMENTS

JP 58-081059 5/1983

(Continued)

OTHER PUBLICATIONS

"Baccarat—Learn to play like a professional with a unique free evaluation- SAVE MONEY", 4 pages; Accessed Oct. 13, 2008; http://web.archive.org/web/20010603045041/www.happyfortune.com/features.htm.

(Continued)

*Primary Examiner* — Ronald Laneau

(57) ABSTRACT

Example methods and devices are set forth for playing a game. In some embodiments, an inventory of game indicia is arranged in a random but established, serial order. In some embodiments, for each hand of play the player makes a wager and game indicia are displayed in order from the inventory to define a winning or losing outcome. In some embodiments, a display, as hands are played, displays the remaining constituency of the inventory and the player, before any game, can order re-shuffling and re-constitute of the inventory. Other embodiments are described.

20 Claims, 7 Drawing Sheets

U.S. PATENT DOCUMENTS 6,869,074 B2 3/2005 Miller
7,056,205 B2 6/2006 Odom
7,086,943 B2 8/2006 Mugnolo et al.
7,114,718 B2 10/2006 Grauzer et al.
7,182,690 B2 2/2007 Giobbi et al.
7,341,519 B2 3/2008 McMain et al.
7,419,162 B2 9/2008 Lancaster et al.
7,425,178 B1 9/2008 Odom
7,431,648 B2 * 10/2008 Odom et al. .................... 463/21
7,523,941 B2 4/2009 Thomas et al.
7,530,572 B2 5/2009 Thomas et al.
7,611,409 B2 11/2009 Muir et al.
7,717,429 B2 5/2010 Lutnick et al.
7,811,167 B2 10/2010 Giobbi et al.
7,914,369 B2 3/2011 Walker et al.
7,942,418 B2 5/2011 Amaitis et al.
8,001,079 B2 * 8/2011 Lu et al. ........................ 707/616
8,079,595 B2 12/2011 Lutnick et al.
8,137,173 B2 3/2012 Miller
8,147,307 B2 4/2012 Miller
8,147,308 B2 4/2012 Miller
8,192,266 B2 6/2012 Alderucci et al.
2001/0035608 A1 11/2001 Hoyt et al.
2002/0068635 A1 6/2002 Hill
2002/0103017 A1 8/2002 Odom et al.
2002/0155872 A1 10/2002 Odom et al.
2002/0195773 A1 12/2002 Dunn
2003/0109310 A1 6/2003 Heaton et al.
2004/0082373 A1 4/2004 Cole et al.
2004/0142742 A1 7/2004 Schneider et al.
2005/0037834 A1 2/2005 Stern et al.
2005/0130728 A1 6/2005 Nguyen et al.
2005/0143158 A1 * 6/2005 Odom et al. .................... 463/13
2005/0161882 A1 7/2005 Miller
2005/0181851 A1 8/2005 Amaitis et al.
2006/0079308 A1 4/2006 Asher et al.
2006/0121978 A1 6/2006 Hornik et al.
2006/0183540 A1 8/2006 Grauzer et al.
2006/0189382 A1 8/2006 Muir et al.
2007/0054721 A1 3/2007 Jackson
2008/0067743 A1 3/2008 Naicker
2008/0090650 A1 4/2008 Tarantino
2008/0119257 A1 5/2008 Stern et al.
2008/0182644 A1 7/2008 Lutnick et al.
2010/0009737 A1 1/2010 Lutnick et al.
2010/0099477 A1 4/2010 Alderucci et al.
2010/0099478 A1 4/2010 Alderucci et al.
2010/0099479 A1 4/2010 Miller
2010/0099481 A1 4/2010 Alderucci et al.
2010/0105457 A1 4/2010 Miller
2010/0105458 A1 4/2010 Miller
2010/0105459 A1 4/2010 Miller
2010/0105465 A1 4/2010 Miller
2010/0113119 A1 5/2010 Miller
2010/0113126 A1 5/2010 Miller
2010/0113137 A1 5/2010 Miller
2011/0180993 A1 7/2011 Amaitis et al.

FOREIGN PATENT DOCUMENTS

JP 10-207103 7/1998
WO WO/96/04970 2/1996

OTHER PUBLICATIONS

"Casino Verite Blackjack History", 8 pages; Accessed Oct. 13, 2008; http://web.archive.org/web/20010819115538/www.qfit.com/cvhist.htm.
Blackjack Table Image, 1 page; Accessed Oct. 13, 2008; http://web.archive.org/web/20010414005535/www.qfit.com/cvssb1.htm.
"Counting Cards", 1 page; Accessed Oct. 13, 2008; http://web.archive.org/web/20010715031334/www.casinosoftware.net/software/html/CC2Setup.zip.html.
"Deck of Cards.Java Programming Assignment"; 4 pages; Accessed Oct. 13, 2008 http://web.archive.org/web/20010418172543/www.cs.clemson.edu/~pargas/courses/cs241/current/assignments/spring2001/p1/DeckOfCards.html.
"Baccarat—Learn to play like a professional with a unique free evaluation- Features", 4 pages; Accessed Oct. 13, 2008 http://web.archive.org/web/20000817072936/http://www.happyfortune.com/features.htm.
Canadian Examiner's Report for Application No. 2,625,171 dated Oct. 7, 2009 (4 pages).
Notification of Transmittal of the International Search Report and Written Opinion for International Application No. PCT/US07/77646, dated Sep. 30, 2008 (11 pages).
International Preliminary Report on Patentability for International Application No. PCT/US07/77646, dated Mar. 10, 2009 (6 pages).
USPTO Office Action for U.S. Appl. No. 11/669,996; dated Feb. 17, 2009 (11 pages).
USPTO Examiner Interview Summary for U.S. Appl. No. 11/669,996; dated Jun. 17, 2009 (4 pages).
Olaf Vancura & Ken Fuchs, Knock-Out Blackjack, Sep. 1998, Huntington Press, 1st Edition, pp. 43-72.
Notification of Transmittal of the International Search Report and Written Opinion for International Application No. PCT/US08/52461, dated Jul. 8, 2008 (10 pages).
International Preliminary Report on Patentability for International Application No. PCT/US08/52461, dated Aug. 4, 2009 (6 pages).
Australian Examiner's Report for Australian Application No. 2008201369, dated Aug. 26, 2009 (2 pages).
USPTO Examiner Interview Summary for U.S. Appl. No. 11/669,996, dated Nov. 23, 2009 (2 pages).
USPTO Notice of Allowance and Fees Due for U.S. Appl. No. 11/669,996; dated Nov. 23, 2009 (8 pages).
USPTO Office Action for U.S. Appl. No. 11/972,002, Mar. 19, 2010 (6 pages).
USPTO Supplemental Notice of Allowability for U.S. Appl. No. 11/669,996, Apr. 6, 2010 (4 pages).
Australian Examiner's Report for Australian Application No. 2007292385, dated May 28, 2010 (2 pages).
USPTO Office Action for U.S. Appl. No. 11/972,002, Jun. 3, 2010 (8 pages).
USPTO Office Action for U.S. Appl. No. 12/688,422, dated Nov. 15, 2010 (7 pages).
USPTO Office Action for U.S. Appl. No. 11/972,002,dated Oct. 20, 2010 (6 pages).
USPTO Notice of Allowance and Fees Due for U.S. Appl. No. 11/972,002, dated Feb. 4, 2011 (7 pages).
U.S. Appl. No. 60/824,522, filed Sep. 5, 2006, Lutnick et al.
U.S. Appl. No. 60/824,648, filed Sep. 6, 2006, Lutnick et al.
USPTO Office Action for U.S. Appl. No. 12/169,383, dated Mar. 28, 2011 (11 pages).
Japanese Office Action with English Translation for Application No. 2009-518656, mailed Mar. 15, 2011 (6 pages).
USPTO Office Action for U.S. Appl. No. 12/252,488, dated Mar. 31, 2011 (7 pages).
USPTO Office Action for U.S. Appl. No. 12/255,123, dated Apr. 20, 2011 (6 pages).
USPTO Office Action for U.S. Appl. No. 12/259,325, dated Apr. 13, 2011 (8 pages).
USPTO Office Action for U.S. Appl. No. 12/263,768, dated Apr. 25, 2011 (6 pages).
Australian Examiner's Report for Australian Application No. 2007292385, dated May 26, 2011 (3 pages).
USPTO Office Action for U.S. Appl. No. 11/850,565, dated May 12, 2011 (7 pages).
USPTO Notice of Allowance and Fees Due and Examiner Interview Summary Record for U.S. Appl. No. 12/688,422, dated Aug. 12, 2011 (11 pages).
USPTO Office Action for U.S. Appl. No. 12/254,485, dated Oct. 7, 2011 (12 pages).
USPTO Office Action for U.S. Appl. No. 12/256,640, dated Sep. 19, 2011 (26 pages).
USPTO Office Action for U.S. Appl. No. 12/257,649, dated Jun. 24, 2011 (6 pages).
USPTO Office Action for U.S. Appl. No. 12/259,330, dated Oct. 4, 2011 (25 pages).
USPTO Office Action for U.S. Appl. No. 12/263,779, dated Jul. 22, 2011 (15 pages).

USPTO Office Action for U.S. Appl. No. 12/263,789, dated Sep. 20, 2011 (23 pages).
Canadian Examiner's Report for Application No. 2,662,856, dated Aug. 19, 2011 (3 pages).
USPTO Office Action for U.S. Appl. No. 12/253,343, dated Oct. 12, 2011 (11 pages).
USPTO Office Action for U.S. Appl. No. 12/252,488, dated Nov. 2, 2011 (4 pages).
USPTO Office Action for U.S. Appl. No. 12/259,325, dated Nov. 21, 2011 (6 pages).
USPTO Office Action for U.S. Appl. No. 12/256,634, dated Apr. 6, 2011 (8 pages).
USPTO Notice of Allowance and Fees Due for U.S. Appl. No. 12/256,634, dated Nov. 7, 2011 (5 pages).
USPTO Office Action for U.S. Appl. No. 11/850,565, dated Dec. 27, 2011 (14 pages).
USPTO Office Action for U.S. Appl. No. 13/081,787, dated Jan. 30, 2012 (6 pages).
USPTO Notice of Allowance and Fees Due for U.S. Appl. No. 12/263,768, dated Dec. 5, 2011 (5 pages).
Australian Examiner's Report for Australian Application No. 2007292385, dated Dec. 7, 2011 (3 pages).
USPTO Notice of Allowance and Fees Due for U.S. Appl. No. 12/255,123, dated Dec. 2, 2011 (5 pages).
USPTO Notice of Allowance and Fees Due for U.S. Appl. No. 12/252,488, dated Feb. 8, 2012 (5 pages).
Australian Notice of Acceptance for Application No. 2007292385, dated Feb. 29, 2012 (3 pages).
USPTO Notice of Allowance and Fees Due for U.S. Appl. No. 12/257,649, dated Mar. 27, 2012 (8 pages).
USPTO Office Action for U.S. Appl. No. 12/263,779, dated Mar. 20, 2012 (14 pages).
Japanese Office Action with English Translation for Application No. 2009-527543, mailed Mar. 21, 2012 (8 pages).
Japanese Office Action with English Translation for Application No. 2009-518656, mailed Apr. 24, 2012 (16 pages).
"Blackjack" (Japanese text), Wikipedia, Jan. 23, 2007 (retrieved on Apr. 9, 2012).

* cited by examiner

PAPER SLOTS 7'S
4 DECK VERSION
CLASS III

MULTI SESSION GAMING

CROSS REFERENCE TO RELATED APPLICATIONS

This application is a continuation of U.S. patent application Ser. No. 12/256,634 filed on Oct. 23, 2008, which is hereby incorporated by reference herein in its entirety.

DESCRIPTION

Figure 1:
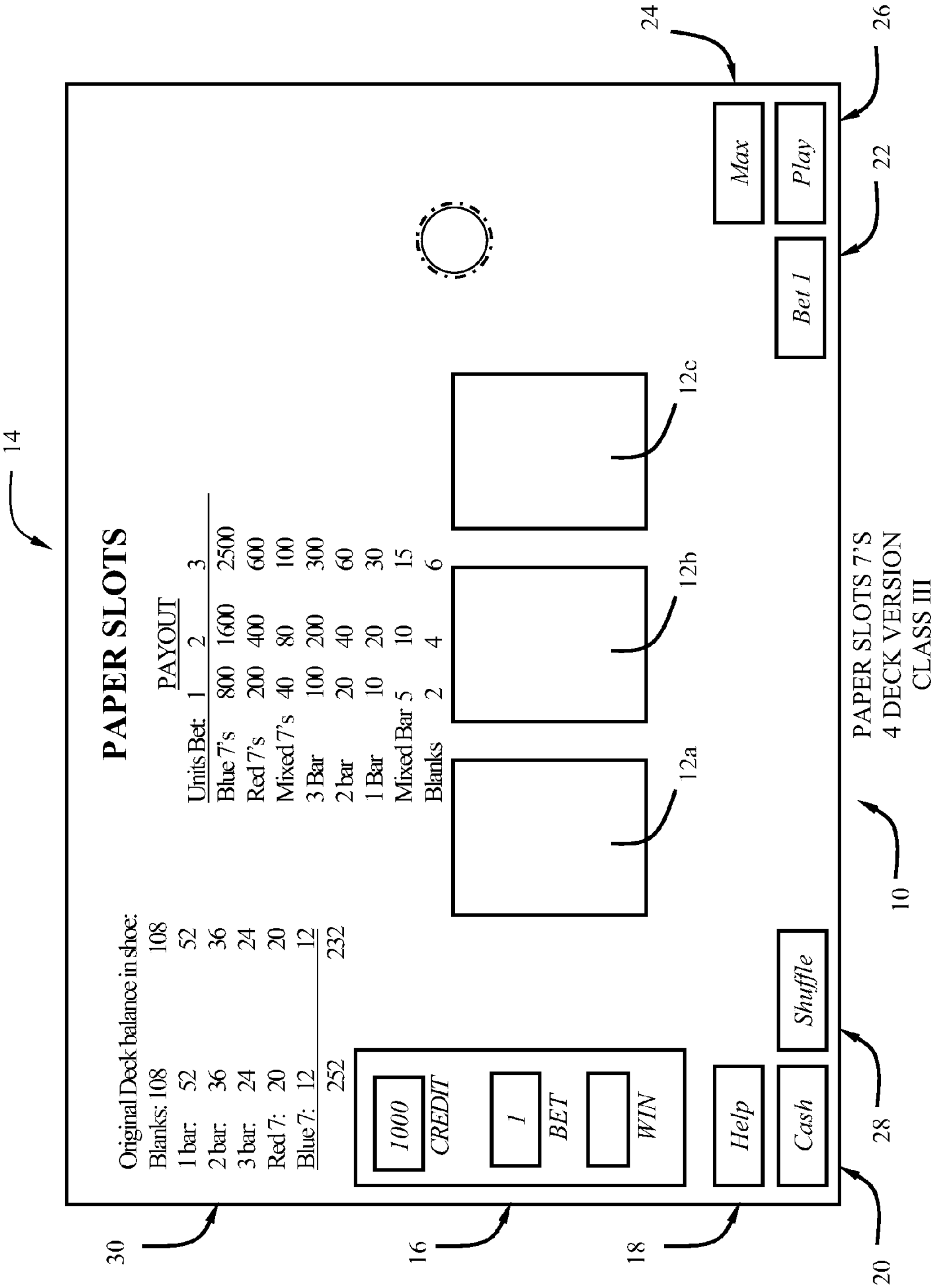
FIG. 1 shows a layout for a screen display for the electronic version before play.

U.S. patent application Ser. No. 09/977,138 entitled "Electronic Card Game and Method," filed Oct. 12, 2001, U.S. Provisional Application Ser. No. 60/241,644 entitled "Electronic Video Poker Game and Method," filed Oct. 19, 2000, U.S. patent application Ser. No. 09/942,520 entitled "Live And Electronic Wagering And Lottery Game," filed Aug. 29, 2001, U.S. Provisional Application Ser. No. 60/229,665 entitled "Live and Electronic Wagering and Lottery Game," filed Aug. 31, 2000, and U.S. patent application Ser. No. 11/007,108, entitled "Method of conducting a wagering game with continuous depletion," filed Dec. 7, 2004 are all hereby incorporated herein by reference.

Some embodiments of the present invention relate to a live and/or electronic wagering and/or lottery game. In some embodiments an inventory of game symbols are arranged in a random order and distributed to define an outcome for the game.

Wagering or casino or lottery games are typically referred to as live games or electronic games. Live games may include those such as Poker, Blackjack, Roulette and the like. Electronic games may include games such as Video Poker and electro-mechanical and video based slot machines. For electronic games, a player inputs a wager which can be money, tokens or fictitious credits. Operation of the device produces an outcome, which can be a winning or a losing outcome.

For Video Poker, virtual cards are dealt and the player, by holding and discarding cards, attempts to construct a winning hand combination. For each hand of play, the cards may be randomly selected from what may be deemed to be a full deck of cards (e.g., by a random number generator). That is, as hands are sequentially played, the virtual deck may not be depleted of the cards that have already been played. After each hand, the game may proceed as though it were being dealt from a freshly shuffled deck.

For slot machines, symbols may be randomly selected and presented along one or more pay lines. The combinations of symbols at an enabled pay line determines whether the player has obtained a winning or a losing outcome.

For live games such as Blackjack, cards may be dealt from a deck or from a shoe containing multiple decks to players. The players assemble a final hand of cards which is the outcome. In Blackjack the final hand is the sum of the values of the cards according to the well known rules of the game. As hands are dealt the deck or shoe is depleted to a point where the cards are reshuffled. Players can keep track of the cards played and thus know which cards remain in the deck or shoe. This may give them an advantage.

It should be recognized that any game may be implemented as a live and/or electronic game. It various embodiments, any game may be played according to various methods and using various apparatus.

Some embodiments may include a game which has the excitement of a slot machine as well as the anticipation accompanying the deal of cards. Some embodiments may include a game where the inventory of symbols is depleted as hands are played, like a deck of cards, until the inventory needs to be re-shuffled. Some embodiments may include an electronic game which permits the player to, after any hand, order re-shuffling of the symbol inventory. Some embodiments may include an electronic game where the remaining inventory of symbols for play can be displayed for the player to see.

Some embodiments of the present invention may include a method and device for a game which randomly arranges game symbols into a serial ordered inventory and displays the same in sequence to define one or more outcomes. In some embodiments, a display displays the constituency of the inventory as symbols are depleted from the inventory during play. In some embodiments, at a prompt by the player or at substantially a predetermined point of exhaustion of the inventory, the inventory is re-constituted and re-shuffled into a random serial order.

In some embodiments, a method includes configuring the game inventory indicia into a random, serial order. In some embodiments, a player makes wagers and plays each of a series of hands. In some embodiments, for each hand of play a predetermined number of game indicia are revealed to define an outcome, said indicia selected in order from the serially arranged inventory. In some embodiments, a method may further include displaying the constituency of the inventory depleted of said revealed indicia for each hand as well as issuing an award to a player obtaining one of a plurality of preselected winning indicia combinations.

In some embodiments, a device for playing a game may include a processor, said processor configured to include means for randomly arranging an inventory of game symbols or indicia into a serial order and a video display. In some embodiments, means may be provided for a player to make a wager and prompt play of the game. In some embodiments, the processor, in response to prompting of play, may be configured to select and display at said display a predetermined number of indicia selected in order from said arranged inventory to define an outcome. In some embodiments, the processor may be configured to compare said outcome to a schedule of winning outcomes stored in a data structure and to issue an award for a winning combination. In some embodiments, the processor may be configured to display the constituency of the remaining symbol inventory.

Turning to FIG. 1, a layout 10 for the game according to the present invention is shown for play as displayed for the electronic version of a game according to some embodiments. According to this embodiment, the display includes three areas, 12*a* through 12*c*, which, as described below, receive game cards as dealt to produce an outcome for the game. The display may also show a pay schedule 14 as well as a credit meter 16 which reflects the number of credits are available for wagering, the amount wagered on a hand of play and the amount won. There also may be provided various buttons embodied as buttons on the machine or as areas on the display touch screen. These buttons include a help button 18 for the player to receive assistance concerning play, a cash out button 20 to cash out accumulated credits, a bet one credit button 22, max bet button 24 and play button 26. Also provided according to some embodiments of the present invention may be a shuffle button 28 the purposes of which will hereinafter become evident.

In some embodiments, to play a device, the player makes a wager by inserting coins or tokens or by depressing the bet one credit button 22 or max bet button 24. The placing of a maximum bet will automatically prompt play of the hand, otherwise the player may depress the play button 26 to start play. Upon the start of play, the processor for the machine, from stored data representing an ordered deck or inventory of game cards, selects and displays three cards in areas 12*a* through 12*c*. In some embodiments, the game includes cards. Certain game cards are as illustrated in FIGS. 3A through 3D. In some embodiments, a virtual deck includes sixty three game cards according to the following distribution:

TABLE US-00001

Distribution of Game Cards

| Symbol | Number in deck |
|---|---|
| "BAR" | 15 |
| "BAR-BAR" | 9 |
| "BAR-BAR-BAR" | 7 |
| Red "7" | 5 |
| Blue "7" | 3 |
| Blank | 24 |
| Total | 63 |

The three cards as selected and displayed represent the outcome for the game. The player wins a payback based preferably based upon the following pay schedule in some embodiments.

TABLE US-00002

Pay Schedule

| Units Bet | 1 | 2 | 3 |
|---|---|---|---|
| 3 Blue 7s | 2000 | 4000 | 6000 |
| 3 Red 7s | 300 | 600 | 900 |
| Mixed 7s | 50 | 100 | 150 |
| 3 BAR-BAR-BAR | 50 | 100 | 150 |
| 3 BAR-BAR | 20 | 40 | 60 |
| 3 BAR | 10 | 20 | 30 |
| Mixed BARs | 5 | 10 | 15 |
| 3 Blanks | 1 | 2 | 3 |

Other pay schedules, symbols and distributions of symbols can be adopted.

Figure 2:
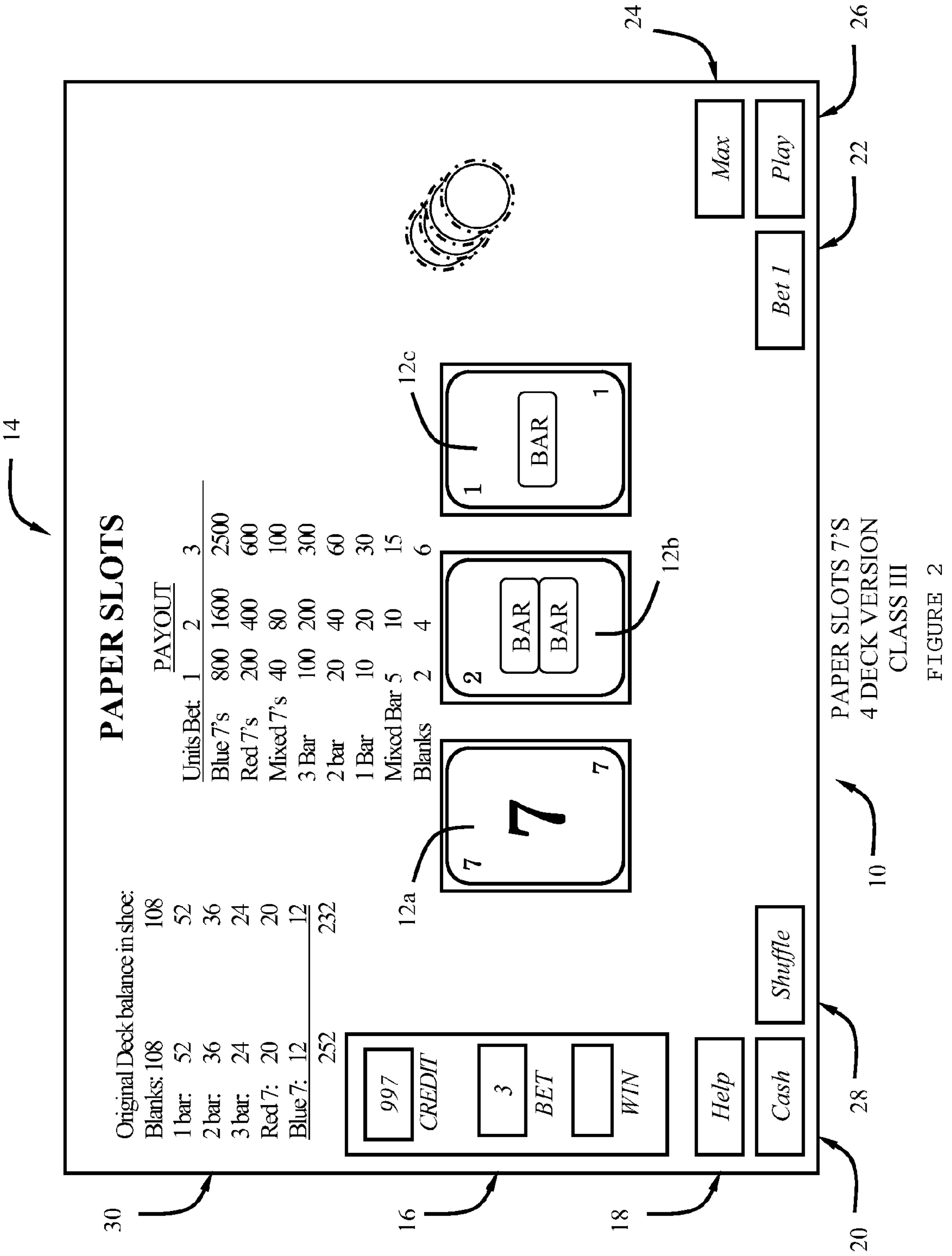
FIG. 2 shows a layout for the screen display for the electronic version after the deal of cards.
Figure 3A:
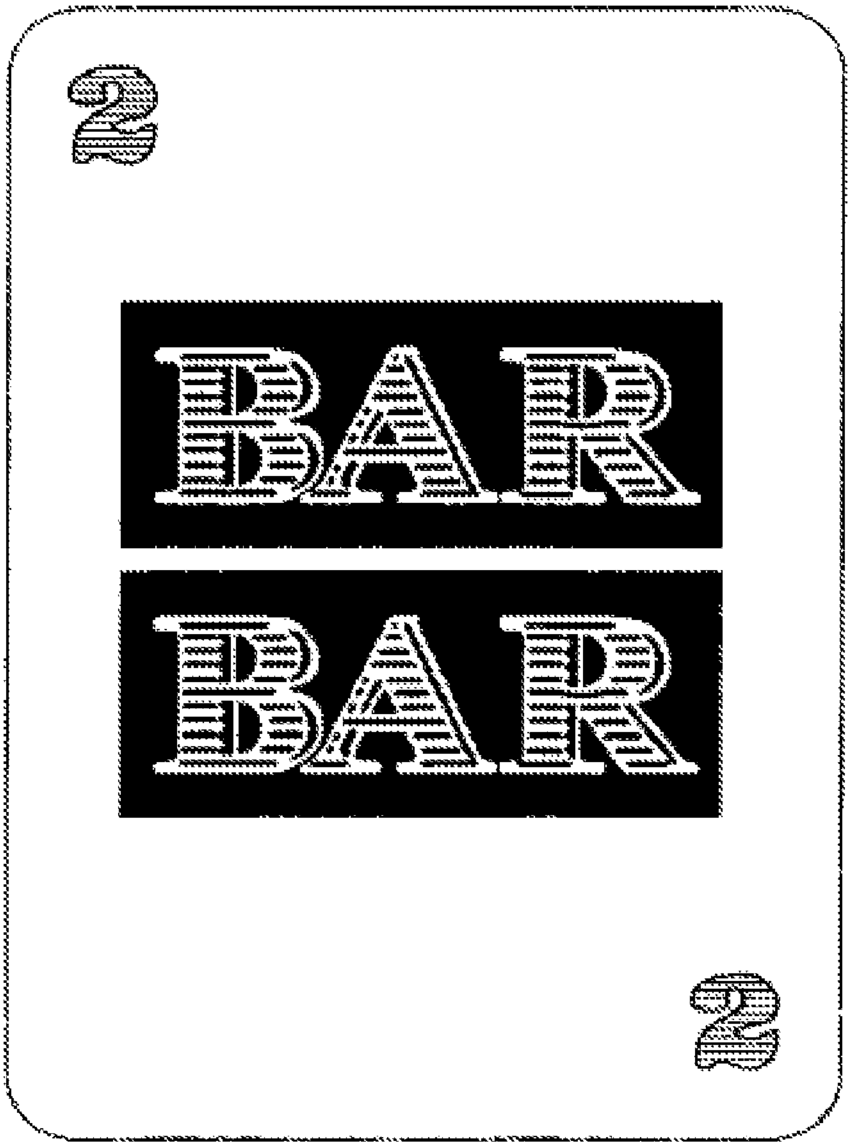
FIGS. 3A through 3D show representations of symbols which may be used for play of the game.
Figure 3B:
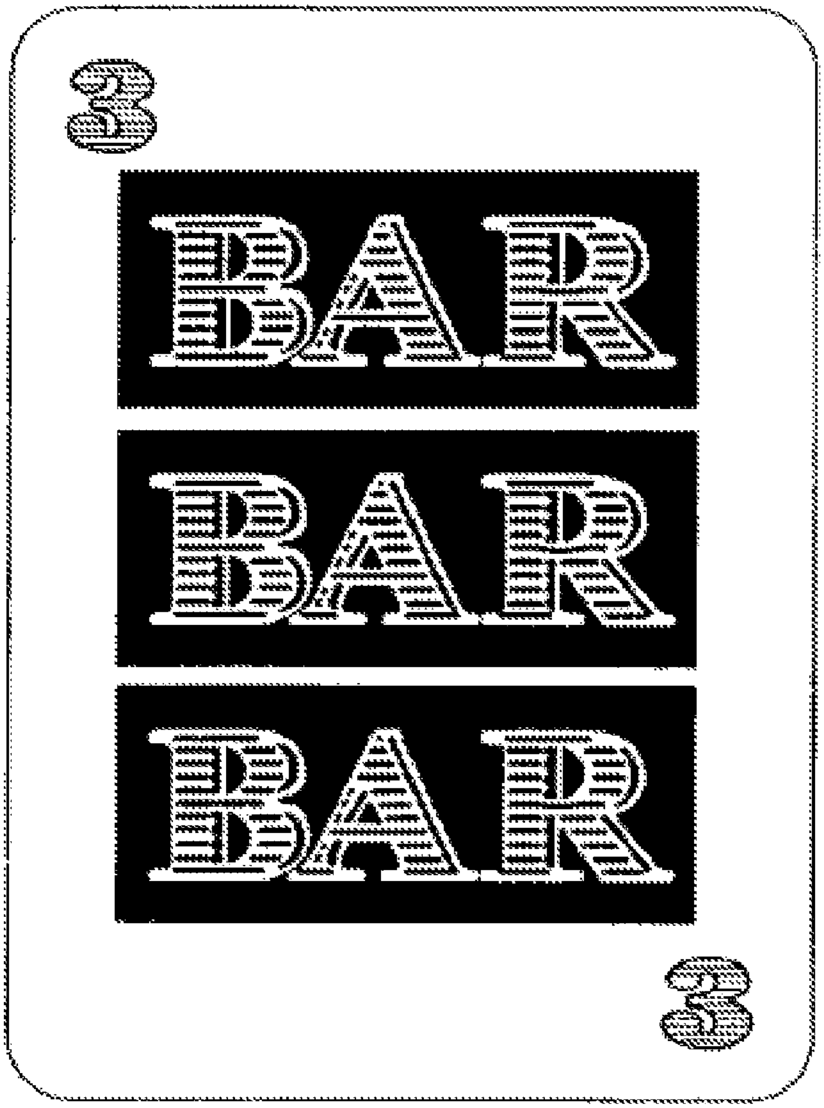
Figure 3C:
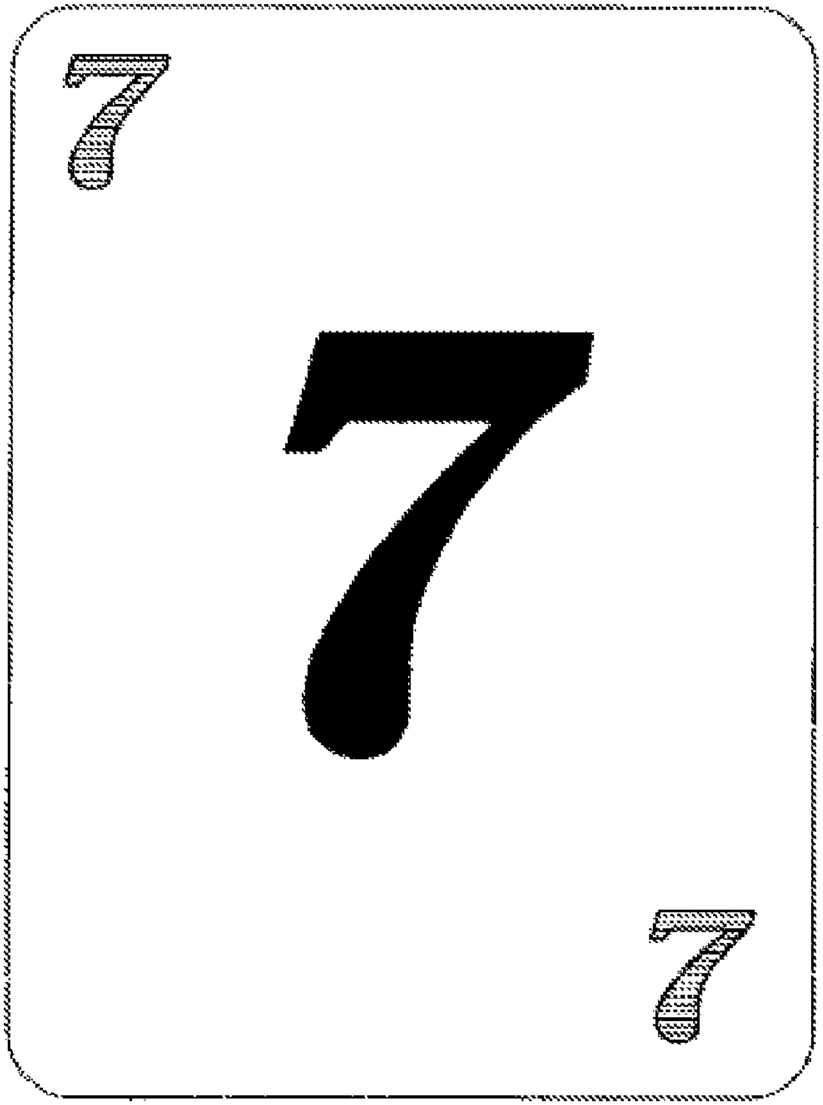
Figure 3D:
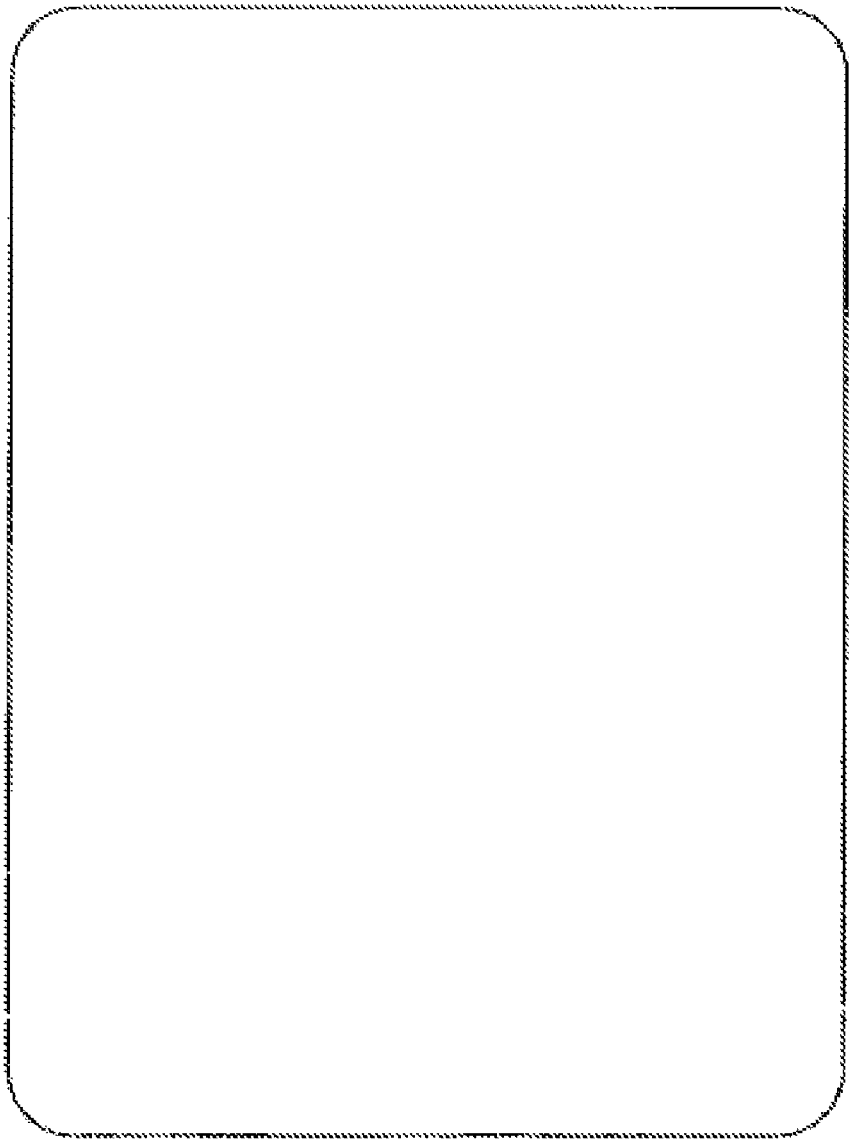

As shown in FIG. 2, the player has not obtained a winning combination since the combination is "7", "BAR-BAR" and "BAR". Thus the player would lose their wager.

In some embodiments, to play the next hand, the player inputs another wager and prompts play whereupon the processor would select and display the next three symbols in the ordered data structure representing the deck of game cards.

Some embodiments may include a data structure of game cards that may be stored in serial order as determined by a virtual shuffle of game cards. For example, the processor for the game may randomly arrange the cards in a serial order 1 through X, where, for the game described herein, X equals 63. In some embodiments, as hands are played one after another, the game cards are selected and displayed in the serial order in which they are positioned in the deck. For example, for the first hand cards in positions 1 through 3 would be displayed and removed from the arranged deck. For example, for the next hand the cards would be selected from positions 4 through 6 and so forth until the deck is depleted or reaches a predetermined location in the arrangement proximate the last sequential card. In some such embodiments, the serial play of hands thus depletes the virtual deck of cards in serial order as cards are selected. In some embodiments, when the deck is depleted to, for example, three remaining game cards, the processor reshuffles the deck and places the cards in a new, random serial order. By random serial order in this embodiments, what is meant is that, like an actual deck, the cards would be randomized and placed in sequence, 1 through X. In other embodiments, such random serialization, reshuffling, reordering, and/or finite decks may not be used and/or any other methods and/or elements may be used.

A feature of some embodiments of the present invention is that prior to entering a wager, the player can depress the help button 18 which controls the game processor to display a deck balance area 30 the constituency of the cards remaining in the deck. For example, if forty cards have been dealt for preceding hands, the balance area would display, for the remaining twenty-three cards, how many Blanks, BARs, BAR-BARs, and 7s remain in the deck. If, for example, all of the Blue 7s have been played thus depriving the player of the ability to have a 3 Blue 7s outcome, the player can depress the shuffle button 28 and the processor will reshuffle and randomize the deck. The ability to see the balance of the deck remaining for play may lead the player to increase their wagers based upon the perception that the probabilities for obtaining a favorable outcome are increased. Further, the ability to reshuffle in some embodiments may also convince the player that the game is fair.

In some embodiments, a game can be played with a single virtual deck or multiple virtual decks. Further the game may be played as a video lottery where it is guaranteed that in any particular cycle of hands, that each series of prizes will be awarded. For example, if the cycle is selected as 238,266 hands, the pay outs and frequencies are as set forth below:

TABLE US-00003

238,266 Hands in Cycle

| Symbols | Hits | Payout | Max Bet Total Payout |
|---|---|---|---|
| Blue 7s | 6 | 6000 | 36,000 |
| Red 7s | 60 | 900 | 54,000 |
| Mixed 7s | 270 | 150 | 40,500 |
| BAR-BAR-BAR | 210 | 150 | 31,500 |
| BAR-BAR | 504 | 60 | 30,240 |
| BAR | 2730 | 30 | 81,900 |
| Mixed BARs | 23,536 | 15 | 352,890 |
| Blanks | 12,144 | 3 | 36,432 |
| | 39,450 | | 663,462 |

Total Play: 714,748
Total Payout: −663,462
Total Hold 51,336 (7.18%)
Hit Ratio: 1 in 6.04 hands Thus, it is seen that for some embodiments of a lottery based game, the game presents a 7.18% hold. This hold can be increased or decreased by altering the pays for one or more winning combinations or by adding more, or deleting, winning combinations.

In some embodiments, for a table game version, a table is provided much like a Blackjack table having, for example, six player positions. At each player position there may be provided the areas 12*a* through 12*c* for the players game cards. Each player may make a wager, the minimums and maximums of which may be dictated by house rules. After each player has made their desired wager, a dealer from a single deck of shuffled game cards or a shoe containing multiple, e.g. four, shuffled decks, may deal three game cards to each of the player's areas 12*a* through 12*c*. Depending upon the combination of cards, as discussed above, the player wins or loses. After paying each winning player and collecting losing wagers, the players make new wagers and new hands are dealt.

In some embodiments, before the start of dealing from a newly shuffled deck the dealer may discard, i.e. burn, three cards. Alternatively, the dealer may deal until there are three cards left in the deck, and then reshuffle. In some embodiments, dealing from the deck or shoe continues until reshuffling is warranted by there being insufficient cards left in the deck to deal hands of three cards to each player.

In some embodiments of an electronic version of the game, the players have the benefit of having displayed the deck balance and ordering reshuffling.

Figure 4:
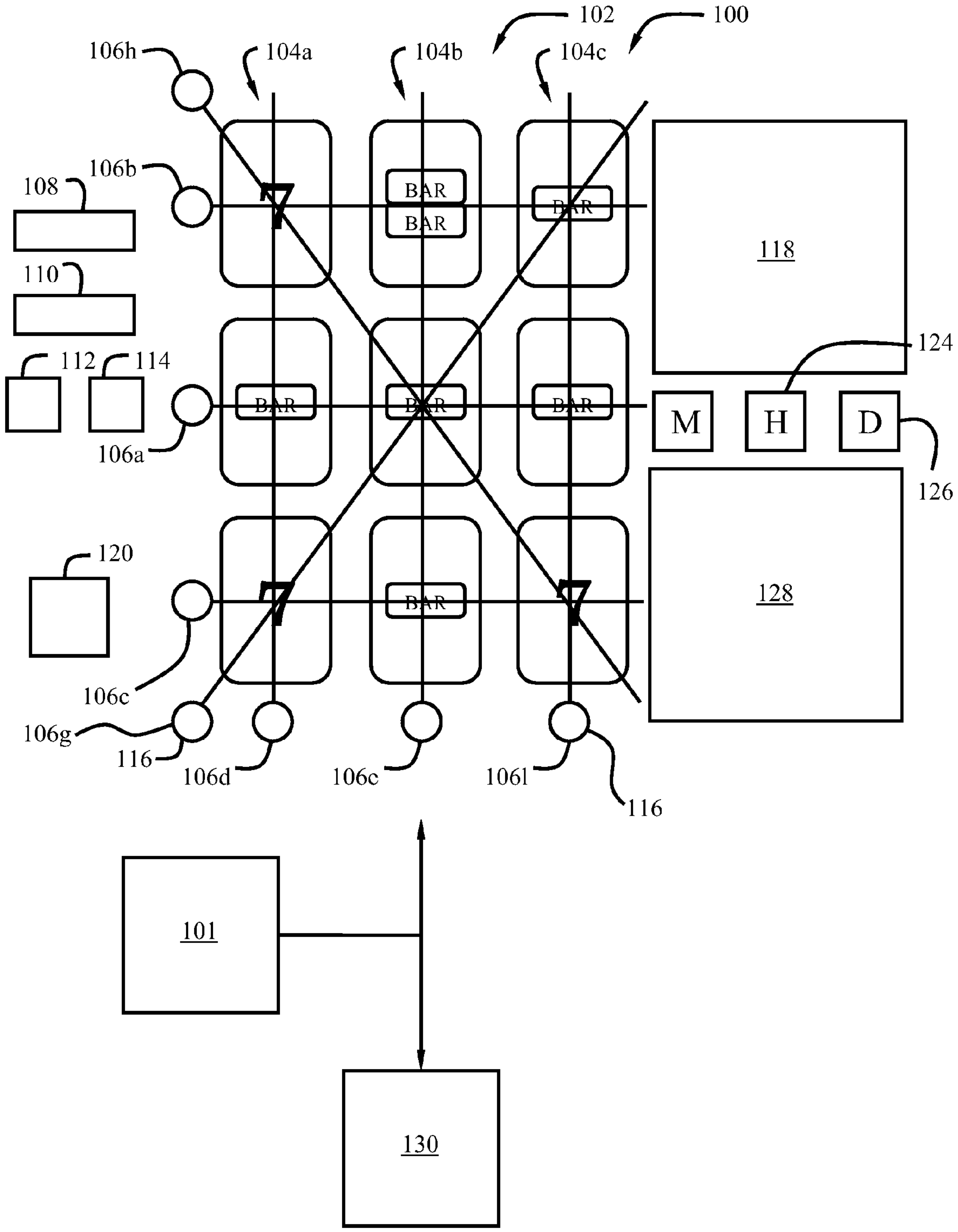
FIG. 4 shows a display for another version of the electronic game.

FIG. 4 illustrates a further example version of an electronic game. In FIG. 4 there is shown and electronic game display 100 controlled by a computer processor 101 to define a three-by-three matrix 102 in the form of a three reel slot machine. Thus the matrix 102 shows three reels 104*a* through 104*c* each having three rows for the display of selected game symbols. The matrix 102 also defines a plurality of pay lines 106*a* through 106*h*, shown as eight which embrace the horizontal rows, the vertical columns formed by the reels 104*a* through 104*c*, and the diagonals. As hereinafter described, game indicia are displayed in the matrix 102 to define outcome for each pay line 106*a* through 106*h*.

In this example embodiment, the processor also controls the display 100 to display other features for the game. At 108 the display 100 shows the total win for the game or spin whereas at 110 the total amount of credits for gaming are displayed. The total wagered for the last game played is displayed at 112. For a current game, before the spin, the total game wager is displayed at 114.

In this example embodiment, in regards to game wagers, each pay line 106*a* through 106*h* includes a banner 116 to indicate the amount being wagered on each corresponding pay line 106*a* through 106*h*. For example, if the player wagers three per pay line, each banner 116 would show "3" and the total game wager would be displayed at 114 as "24" (3.times.8 pay lines).

The display 100 also, in this example embodiment of the present invention, displays at 118 the inventory of symbols remaining for play. For example, where there are 63 symbols, after the initial shuffle the inventory of display may display the following:

TABLE US-00004

| Symbols | Remaining |
|---|---|
| Blue 7s | 3 |
| Red 7s | 5 |
| BAR-BAR-BAR | 7 |
| BAR-BAR | 9 |
| BAR | 15 |
| Blanks | 24 |
| Total | 63 |

In some embodiments, as hands or games are played, the inventory display 118 would be depleted based upon the depletion of the symbols from the serial inventory. For example, and with reference to FIG. 4, the inventory may be now shown to be the following (all 7s in FIG. 4 assumed to be Red 7s):

TABLE US-00005

| Symbols | Remaining |
|---|---|
| Blue 7s | 3 |
| Red 7s | 2 |
| BAR-BAR-BAR | 7 |
| BAR-BAR | 8 |
| BAR | 10 |
| Blanks | 24 |

In some embodiments, as games are played the player can assess the constituency of the remaining inventory. This feature may alter the wagering decisions of the player, e.g. to increase or decrease the wagers. It should be recognized that some embodiments may not include serial inventories, such depletion of symbols, and/or any other elements.

In some embodiments, in the event the player is dissatisfied with the remaining constituency of the inventory, the player can order the inventory to be re-shuffled by, for example, touching a touch screen button 120. In some embodiments, for re-shuffling the inventory is returned to its full symbol inventory, e.g. 63 symbols, and the symbols are randomly shuffled and placed in serial order. In some embodiments, the inventory display 118 may show a reconstituted, full, inventory. It should be recognized that some embodiments may not include such reshuffling, such touch screen buttons, and/or any other elements.

In some embodiments, the display 100, which again may be a touch screen display, includes other features. At 122 a button is presented, the touching of which applies a maximum wager to the game, e.g. 24 units. The wager, as with all wagers, may deplete the credit inventory displayed at 110. A help button 124 controls the game processor to display game information to the player. Finally, at 126 there is a deal button 126 which prompts play of a hand.

In some embodiments, at 128 the display 100 shows a pay table for winning pay line combinations. The winning combinations would be preselected and stored in a data structure for the processor 101.

TABLE-US-00006

| Pay Table | | | |
|---|---|---|---|
| Wager | 1 | 2 | 3 |
| Blue 7s | 3000 | 6000 | 9000 |
| Red 7s | 300 | 600 | 900 |
| Any 7s | 50 | 100 | 150 |
| BAR-BAR-BAR | 50 | 100 | 150 |
| BAR-BAR | 20 | 40 | 60 |
| BAR | 10 | 20 | 30 |
| Any Bar | 5 | 10 | 15 |
| Blanks | 1 | 2 | 3 |

In some embodiments, to play the example game of FIG. 4, the player wagers on one or more pay lines 106*a* through 106*h*. For purposes of this description it shall be assumed that the player has depressed the maximum wager button 122 to wager 3 units on each pay line 106*a* through 106*h*. The processor is prompted to select nine symbols from the beginning of the serial, random inventory and displays the same in the rows and columns of the game matrix 102 as shown. Based upon the symbols selected and displayed the player has obtained certain winning outcomes as tabulated below (all 7s are Red 7s):

TABLE-US-00007

| Pay line | Award |
|---|---|
| 106a | 30 (Three “BARs”) |
| 106e | 15 (Three Any “BARs”) |
| Total win | 45 |

In some embodiments, the award is displayed at 108 and may be issued at 130 in the form of credits, tokens, printed ticket or as otherwise known in the art.

In some embodiments, the inventory display 118 may show the displayed symbols removed from the inventory as tabulated above. In some embodiments, the player would enter wagers to play the next game. In some embodiments, based upon the displayed inventory, the player may choose before any play to re-shuffle and re-constitute the inventory by touching the re-shuffle button 120. In some embodiments, for example, if all of the Red and Blues 7s have been depleted from the inventory, the player would re-shuffle so that the higher award pay outs would be possible.

According to a further embodiment, the game may include “Wild” symbols which are wild to complete any winning outcome. Further the game symbols may be representations of playing cards. In some embodiments, a displayed, fully constituted inventory would be, for example, as follows:

TABLE-US-00008

| Symbol | Number |
|---|---|
| Wild | 4 |
| Kings | 5 |
| Queens | 6 |
| Jacks | 8 |
| 10s | 10 |
| Blanks | 30 |
| Total | 63 |

Further the pay table for the example game may be as follows:

TABLE-US-00009

| Pay Table | | | |
|---|---|---|---|
| Wager | 1 | 2 | 3 |
| Wilds | 800 | 1500 | 2500 |
| Kings | 100 | 200 | 300 |
| Queens | 50 | 100 | 150 |
| Jacks | 20 | 40 | 60 |
| 10s | 10 | 20 | 30 |
| Blanks | 1 | 2 | 3 |

Thus the game may use any suitable symbols if desired. Further the game matrix 102 may be expanded to four, five or more reels and may include more or less pay lines.

In some embodiments, the game can also be played as a live game where the indicia are put on cards which are dealt to each player from the deck including the card distribution as set forth above. In some embodiments, each player makes a wager and is dealt three cards from the deck which define the outcome. In some embodiments, at a predetermined point of penetration into the deck, e.g. 5 rounds of play, the deck is reconstituted and re-shuffled. In some embodiments, the player based upon the known distribution of symbols, may also be permitted to order reconstituting and re-shuffling of the deck for the next hand.

In some embodiments, a player may not have an option to restore/reshuffle a deck. In such embodiments, at least one additional sequential game hand may be conducted using a finite set/deck data/inventory cumulatively excluding dealt game indicia until an automatic restoration event. Such an event may include, for example, a number of cards being dealt, a number of hands played, a particular state of a shoe, when a cut card is reached, and so on. In some implementations, a virtual card may be placed in a deck at a desired location and when the cut card is reached the deck may be reshuffled/restored. In some implementations, the reshuffle/restore may occur before the start of a next hand. In other implementations, the reshuffle/restore may occur at a time when the automatic event is triggered (e.g., even if it is in the middle of a hand). In some implementations, a cut card may be placed in a deck between a desired range of cards (e.g., in the middle third of a deck), at a random location in a deck, and/or in any other desired location and/or fashion.

Some embodiments may include saving a state of a finite set/deck data/an inventory. Such a state may be saved, for example after a first gaming session. Saving a state may include, for example, storing information describing a current circumstance of a deck, such information may be stored, for example, in a database, and/or on any computer readable medium. A gaming session, for example, may include any number of games played. A gaming session may end, for example, when a player turns a device used to play the game off, leaves a gaming machine, turns a computer program used to play a device off, switches applications on a computer, visits a different website than the one used to play a game, and/or takes any other action to stop the play of a game.

Some embodiments may include restoring a state of a game at a start of a second gaming session. The start of a gaming session may include any time before play of a game begins (e.g., before cards are dealt, before a player is given an option to make a move in a game, etc.). Restoring a state may include receiving/retrieving stored information. Such information may be retrieved from a database and/or any computer readable medium. Be restoring the state, the player may begin play using a deck that has been depleted to the extent it was depleted in the prior session. Accordingly, a player may be unable to perform a manual restoration by turning a game off and back on, in some such implementations.

In some implementations, information about a state may be stored in a location that may withstand a reset of a gaming device, for example, a permanent storage device such as a hard disk drive. In some implementations, such information may be updated each time a card is dealt so that the information is up to date at all instances.

In some implementations, a first gaming session may take place on a first device and a second gaming device. Each gaming device may have access to the state information (e.g., through a communication network). The state information may be stored for example, on a networked drive or other network accessible storage medium. The state information may be stored on a card or other id that a player carries with her and may be used by the player to start a game (e.g., similar to the well known TITO system storage of money information). In some implementations, a player may end a computer program to end a session and begin a computer program at a same or different device to begin a second session. A computer program may include, for example a java script program, an AJAX program, a web browser, a web based application, a stand alone program, and/or any other program.

While certain embodiments of the present invention have been described, it should be understood that it is subject to many modifications and changes without departing from the spirit and scope of the appended claims.

What is claimed is:

1. A method comprising:

for each of the plurality of first rounds of a game:

(a) determining, by a computing device, a respective plurality of game elements from a set of game elements to make up a respective outcome, in which the set of game elements is arranged into a plurality of subsets that each include a respective at least two game elements, and (b) removing, by the computing device, each of the determined game elements from the set for play in subsequent rounds of the plurality of first rounds;

prior to play of at least some of the first rounds, displaying, by the computing device, a number of game elements remaining in each subset of the plurality of subsets after previously determined game elements have been removed from the set;

saving, by the computing device, a state of the set without the determined and removed game elements at the end of a first gaming session;

restoring, by the computing device, the state of the set for use in a plurality of second rounds of the game; and facilitating, by the computing device, the plurality of second rounds using the set until an automatic restoration event.

2. The method of claim 1, comprising:

receiving a respective wager for each round of the first and second rounds; and providing an award based on outcomes of at least some of the first and second rounds; and in which displaying the number of game elements includes enabling a player to deduce winning outcomes eliminated as a result of removing the game elements.

3. The method of claim 1, in which the first gaming session takes place on a first gaming device and the second gaming session takes place on a second gaming device.

4. The method of claim 1, further comprising ending a gaming program to end the first gaming session; and starting the gaming program to start the second gaming session.

5. An apparatus comprising:

a computing device; and a non-transitory machine readable medium having stored thereon a plurality of instructions that when executed by the computing device cause the apparatus to:

for each of the plurality of first rounds of a game:

(a) determine a respective plurality of game elements from a set of game elements to make up a respective outcome, in which the set of game elements is arranged into a plurality of subsets that each include a respective at least two game elements, and (b) remove each of the determined game elements from the set for play in subsequent rounds of the plurality of first rounds;

prior to play of at least some of the first rounds, display a number of game elements remaining in each subset of the plurality of subsets after previously determined game elements have been removed from the set;

save a state of the set without the determined and removed game elements at the end of a first gaming session;

restore the state of the set for use in a plurality of second rounds of the game; and facilitate the plurality of second rounds using the set until an automatic restoration event.

6. A method comprising:

for each of the plurality of first rounds of a game:

(a) determining, by a computing device, a respective plurality of game elements from a set of game elements to make up a respective outcome, and (b) removing, by the computing device, each of the determined game elements from the set for play in subsequent rounds of the plurality of first rounds;

displaying, by the computing device, information indicating at least one of a makeup of the set after previously determined game elements have been removed and a makeup of the previously determined game elements that have been removed from the set;

saving, by the computing device, a state of the set without the determined and removed game elements at the end of a first gaming session;

restoring, by the computing device, the state of the set for use in a plurality of second rounds of the game; and facilitating, by the computing device, the plurality of second rounds using the set until an automatic restoration event.

7. The method of claim 6, comprising:

receiving a respective wager for each round of the first and second rounds; and providing an award based on outcomes of at least some of the first and second rounds; and in which displaying the information includes enabling a player to deduce winning outcomes eliminated as a result of removing the game elements.

8. The method of claim 6, in which the first gaming session takes place on a first gaming device and the second gaming session takes place on a second gaming device.

9. The method of claim 6, further comprising ending a gaming program to end the first gaming session; and starting the gaming program to start the second gaming session.

10. An apparatus comprising:

a computing device; and a non-transitory machine readable medium having stored thereon a plurality of instructions that when executed by the computing device cause the apparatus to:

for each of the plurality of first rounds of a game:

(a) determine a respective plurality of game elements from a set of game elements to make up a respective outcome, and (b) remove each of the determined game elements from the set for play in subsequent rounds of the plurality of first rounds;

display information indicating at least one of a makeup of the set after previously determined game elements have been removed and a makeup of the previously determined game elements that have been removed from the set;

save a state of the set without the determined and removed game elements at the end of a first gaming session;

restore the state of the set for use in a plurality of second rounds of the game; and facilitate the plurality of second rounds using the set until an automatic restoration event.

11. The method of claim 10, comprising:

receiving a respective wager for each round of the first and second rounds; and providing an award based on outcomes of at least some of the first and second rounds; and in which displaying the information includes enabling a player to deduce winning outcomes eliminated as a result of removing the game elements.

12. The method of claim 10, in which the first gaming session takes place on a first gaming device and the second gaming session takes place on a second gaming device.

13. The method of claim 10, further comprising ending a gaming program to end the first gaming session; and starting the gaming program to start the second gaming session.

14. A method comprising:

determining, by a computing device, a set of game elements arranged into a randomized order;

determining, by the computing device, a respective plurality of game elements from the set of game elements to make up an outcome of a first round of a game by removing each of the plurality of game elements from the set in order;

displaying, by the computing device, information indicating a makeup of the set after removing the plurality of game elements;

saving, by the computing device, a state of the set without the plurality of game elements;

restoring, by the computing device, the state of the set for use in at least one second rounds of the game; and facilitating, by the computing device, the at least one second round using the set until an automatic restoration event.

15. The method of claim 14, comprising:

receiving a respective wager for each of the first and second rounds; and providing an award based on outcomes of at least one of the first and second rounds; and in which displaying the information enabling a player to deduce winning outcomes eliminated as a result of removing the plurality of game elements.

16. The method of claim 14, in which the first gaming session takes place on a first gaming device and the second gaming session takes place on a second gaming device.

17. The method of claim 14, further comprising ending a gaming program to end the first gaming session; and starting the gaming program to start the second gaming session.

18. An apparatus comprising:

a computing device; and a non-transitory machine readable medium having stored thereon a plurality of instructions that when executed by the computing device cause the apparatus to:

determine a set of game elements arranged into a randomized order;

determine a respective plurality of game elements from the set of game elements to make up an outcome of a first round of a game by removing each of the plurality of game elements from the set in order;

display information indicating a makeup of the set after removing the plurality of game elements;

save a state of the set without the plurality of game elements;

restore the state of the set for use in at least one second rounds of the game; and facilitate the at least one second round using the set until an automatic restoration event.

19. A method comprising:

for each of the plurality of first rounds of a game:

(a) determining, by a computing device, a respective plurality of game elements from a set of game elements to be placed into respective locations in a game matrix to makes up a respective outcome, in which the set of game elements is arranged into a plurality of subsets that each include a respective at least two game elements, and (b) removing, by the computing device, each of the determined game elements from the set for play in subsequent rounds of the plurality of first rounds;

prior to play of at least some of the first rounds, displaying, by the computing device, information indicating at least one of a makeup of the set after previously determined game elements have been removed and a makeup of the previously determined game elements that have been removed from the set;

saving, by the computing device, a state of the set without the determined and removed game elements at the end of a first gaming session;

restoring, by the computing device, the state of the set for use in a plurality of second rounds of the game; and facilitating, by the computing device, the plurality of second rounds using the set until an automatic restoration event.

20. An apparatus comprising:

a computing device; and a non-transitory machine readable medium having stored thereon a plurality of instructions that when executed by the computing device cause the apparatus to:

for each of the plurality of first rounds of a game:

(a) determine a respective plurality of game elements from a set of game elements to be placed into respective locations in a game matrix to makes up a respective outcome, in which the set of game elements is arranged into a plurality of subsets that each include a respective at least two game elements, and (b) remove each of the determined game elements from the set for play in subsequent rounds of the plurality of first rounds;

prior to play of at least some of the first rounds, display information indicating at least one of a makeup of the set after previously determined game elements have been removed and a makeup of the previously determined game elements that have been removed from the set;

save a state of the set without the determined and removed game elements at the end of a first gaming session;

restore the state of the set for use in a plurality of second rounds of the game; and facilitate the plurality of second rounds using the set until an automatic restoration event.

* * * * *